(12) United States Patent
Park et al.

(10) Patent No.: US 12,715,400 B2
(45) Date of Patent: Aug. 25, 2026

(54) BRAKE SYSTEM AND CONTROL METHOD THEREOF

(71) Applicant: HL MANDO CORPORATION, Gyeonggi-do (KR)

(72) Inventors: Jaehyun Park, Gyeonggi-do (KR); Youngjin Kwon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 44 days.

(21) Appl. No.: 18/898,645

(22) Filed: Sep. 26, 2024

(65) Prior Publication Data

US 2025/0313176 A1 Oct. 9, 2025

(30) Foreign Application Priority Data

Apr. 5, 2024 (KR) ........................ 10-2024-0046412

(51) Int. Cl.

| | |
|---|---|
| ***B60T 8/171*** | (2006.01) |
| ***B60T 8/18*** | (2006.01) |
| ***F16D 51/22*** | (2006.01) |
| ***F16D 65/22*** | (2006.01) |
| ***F16D 66/00*** | (2006.01) |
| *F16D 121/24* | (2012.01) |

(52) U.S. Cl.

CPC .............. *B60T 8/171* (2013.01); *F16D 65/22* (2013.01); *F16D 66/00* (2013.01); *B60T 2220/04* (2013.01); *B60T 2270/406* (2013.01); *F16D 51/22* (2013.01); *F16D 2066/003* (2013.01); *F16D 2066/005* (2013.01); *F16D 2066/006* (2013.01); *F16D 2121/24* (2013.01)

(58) Field of Classification Search

CPC .... B60T 8/171; B60T 8/1881; B60T 2220/04; B60T 2270/406; F16D 65/22; F16D 66/00; F16D 51/22; F16D 2066/003; F16D 2066/005; F16D 2066/006; F16D 2121/24

See application file for complete search history.

(56) References Cited

U.S. PATENT DOCUMENTS

2017/0321773 A1* 11/2017 Lee ....................... F16D 55/226
2018/0229698 A1* 8/2018 Salmon ..................... B60T 7/12

FOREIGN PATENT DOCUMENTS

KR 10-2011-0060260 6/2011
KR 10-1836628 3/2018
KR 10-2555204 7/2023

* cited by examiner

*Primary Examiner* — Jacob M Amick
(74) *Attorney, Agent, or Firm* — WOMBLE BOND DICKINSON (US) LLP

(57) ABSTRACT

A brake system may include: a drum; a brake shoe including a frictional member applying frictional force to the drum; a motor moving the brake shoe; a force sensor detecting clamping force of the frictional member to the drum; and a controller electrically connected to the motor and the force sensor, and the controller may determine a first position of the frictional member to the drum at a braking force generation start time based on current applied to the motor or torque of the motor upon controlling the motor for braking, and control the motor so that an interval between the drum and the frictional member is adjusted based on the first position when the force sensor is in a failure state upon controlling the motor for releasing the braking.

18 Claims, 6 Drawing Sheets

BRAKE SYSTEM AND CONTROL METHOD THEREOF

CROSS-REFERENCE TO RELATED APPLICATIONS

This application claims the priority of Korean Patent Application No. 10-2024-0046412 filed on Apr. 4, 2024, in the Korean Intellectual Property Office, the disclosure of which is incorporated herein by reference.

BACKGROUND

Field

The present disclosure relates to a brake system and a control method thereof, and more particularly, to a brake system and a control method thereof which can secure braking safety even in the failure of a force sensor that detects clamping force generated through an auto-adjuster of the brake system.

Description of the Related Art

A conventional drum-type brake system has a larger nonlinear feature than a caliper-type brake system, and due to a high brake factor (BF), precise control of a total shoe center clearance (TSCC) between a drum and a frictional member is needed.

For example, the conventional brake system including a drum brake controls the TSCC between the drum and the frictional member through a separate auto-adjuster. However, since the corresponding parts are hardware parts, precision deteriorates, and a deviation can be generated in braking responsiveness generated from left and/or right drum brakes, and the deviation generated in the braking responsiveness reduces the safety of a vehicle.

According to limiting conditions of such hardware parts, the development of a brake system containing a drum-type electric mechanical brake (EMB) using a force sensor has been underway.

The EMB means a device that can generate braking force by generating clamping force through a motor and the auto-adjuster instead of hydraulic pressure in an existing brake device that generates the braking force through the hydraulic pressure.

The force sensor is attached to the EMB to detect the clamping force of a frictional member included in the EMB to the drum, and the detected clamping force can play an important role in providing appropriate braking to a vehicle according to brake manipulation of a driver.

As a result, when the force sensor fails, a big problem can be caused in the safety of the brake system.

However, there is no development of a control technology that can secure the safety of the brake system in the event of the failure of the force sensor up to now. Accordingly, the development of the corresponding control technology is required.

SUMMARY

An object to be achieved by the present disclosure is to provide a brake system and a control method thereof which may secure braking safety even when a force sensor is in a failure state.

For example, the brake system and the control method thereof may provide a technology that may generate braking force even when the force sensor is in the failure state, for example, generate the braking force even though the force sensor shows a degraded performance compared to a normal state of the force sensor.

Further, the brake system and the control method thereof may provide a technology that may prevent a drag phenomenon even when the force sensor is in the failure state.

According to an aspect of the present disclosure, a brake system may include: a drum; a brake shoe including a frictional member applying frictional force to the drum; a motor configured to move the brake shoe; a force sensor configured to detect clamping force of the frictional member to the drum; and a controller electrically connected to the motor and the force sensor, and the controller may determine a first position of the frictional member to the drum at a braking force generation start time based on current applied to the motor or torque of the motor upon controlling the motor for braking, and control the motor so that an interval between the drum and the frictional member is adjusted based on the first position when the force sensor is in a failure state upon controlling the motor for releasing the braking.

The controller may control the motor so that the interval between the drum and the frictional member is further increased by an interval obtained by aggregating the first position and a predetermined reference interval from the first position when the force sensor is in the failure state upon controlling the motor for releasing the braking.

The controller may, when the force sensor is in a normal state upon controlling the motor for releasing the braking, identify a time when the drum and the frictional member are separated from each other based on an output signal of the force sensor, and control the motor to adjust the interval between the drum and the frictional member based on a second position of the frictional member to the drum at the identified time above.

The controller may control the motor so that the interval between the drum and the frictional member is further increased by an interval obtained by aggregating the second position and a predetermined reference interval from the second position when the force sensor is in the normal state upon controlling the motor for releasing the braking.

The controller may determine the second position based on a reference magnitude of the output signal of the force sensor, which is predetermined to correspond to the time when the drum and the frictional member are separated from each other.

The controller may determine a state of the force sensor as the failure state or the normal state based on the output signal of the force sensor.

The controller may determine the state of the force sensor as the failure state or the normal state in response to the control of the motor for releasing the braking.

The controller may determine the first position further based on a reference current value or a reference torque value of the motor, which is predetermined to correspond to the braking force generation start time.

The brake system may further include a communication unit communicating with at least one device of a vehicle, and the controller may control the motor to achieve the braking or release the braking based on a braking request signal or a braking release request signal received through the communication unit.

The brake system may further include a communication unit communicating with at least one device of the vehicle, and the controller may transmit information indicating that the force sensor is in the failure state to at least one device of the vehicle through the communication unit.

According to another aspect of the present disclosure, a control method of a brake system including a drum, a brake shoe including a frictional member applying frictional force to the drum, a motor configured to move the brake shoe, and a force sensor configured to detect clamping force of the frictional member to the drum may include: determining a first position of the frictional member to the drum at a braking force generation start time based on current applied to the motor or torque of the motor upon controlling the motor for braking; and controlling the motor so that an interval between the drum and the frictional member is adjusted based on the first position when the force sensor is in a failure state upon controlling the motor for releasing the braking.

The controlling of the motor so that the interval between the drum and the frictional member is adjusted based on the first position may include controlling the interval between the drum and the frictional member to be further increased by an interval obtained by aggregating the first position and a predetermined reference interval from the first position.

The control method of a brake system may include, when the force sensor is in a normal state upon controlling the motor for releasing the braking, identifying a time when the drum and the frictional member are separated from each other based on an output signal of the force sensor, and controlling the motor to adjust the interval between the drum and the frictional member based on a second position of the frictional member to the drum at the time identified time.

The controlling of the motor so that the interval between the drum and the frictional member is adjusted based on the second position may include controlling the motor so that the interval between the drum and the frictional member is further increased by an interval obtained by aggregating the second position and a predetermined reference interval from the second position.

The second position may be determined based on a reference magnitude of the output signal of the force sensor, which is predetermined to correspond to the time when the drum and the frictional member are separated from each other.

The control method of a brake system may further include determining a state of the force sensor as the failure state or the normal state based on the output signal of the force sensor.

The determining of the state of the force sensor as the failure state or the normal state may be performed in response to the control of the motor for releasing the braking.

The determining of the first position may be performed further based on a reference current value or a reference torque value of the motor, which is predetermined to correspond to the braking force generation start time.

The control of the motor for the braking and the control of the motor for releasing the braking may be performed based on reception of a braking request signal or a braking release request signal of the vehicle.

The control method of a brake system may further include transmitting information indicating that the force sensor is in the failure state to at least one device of the vehicle.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
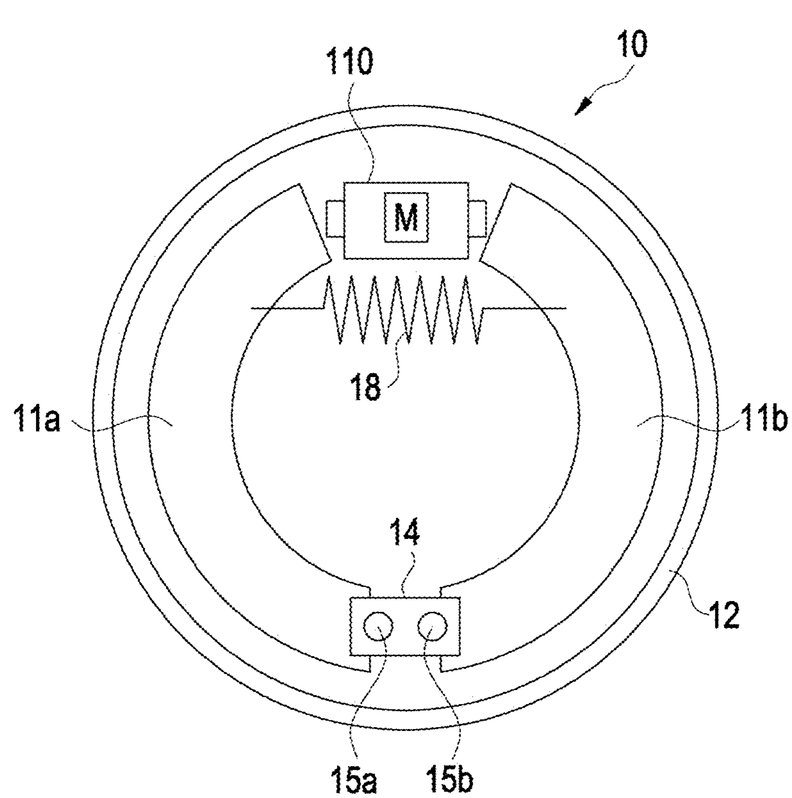
FIG. 1 is a diagram illustrating a drum brake of a brake system according to an exemplary embodiment.

Like reference numerals refer to like components throughout the specification. This specification does not describe all the components of the embodiments, and duplicative contents in the contents between embodiments or general technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

Hereinafter, the exemplary embodiment of the present disclosure will be described with reference to the accompanying embodiments as follows. Scales of drawings and exemplary components illustrated in the accompanying drawings are different from the real scales for the purpose of description, so that the scales are not limited to those illustrated in the drawings.

The present disclosure is to provide a technology in which even in a failure state of a force sensor used as a key control factor in a brake system including a drum-type electric mechanical brake (EMB), the brake system may stably perform braking control.

For example, the present disclosure is to provide a technology in which when the force sensor attached to the drum-type EMB fails, the brake system may stably perform the braking control so that a driver may continue vehicle driving even though the drum-type EMB operates with a degraded performance.

For example, the present disclosure may provide a control technology which may output information (e.g., output information through a cluster of the vehicle) so that the driver may know that the force sensor is in the failure state, and allow the vehicle to be safely driven, for example, allow the vehicle to be safety driven to a service center, when the force sensor attached to the drum-type EMB fails.

Hereinafter, the drum-type EMB will be described as a drum brake.

Hereinafter, an operation principle and exemplary embodiments of the present disclosure will be described with reference to the accompanying drawings.

FIG. 1 is a diagram illustrating a drum brake of a brake system according to an exemplary embodiment.

Figure 2:
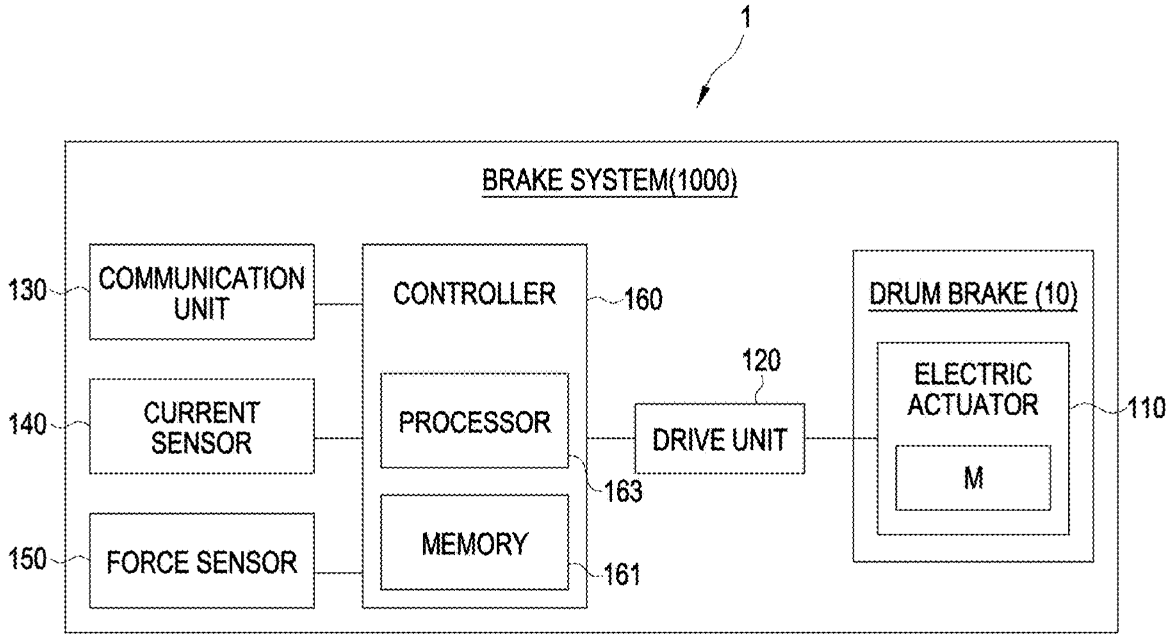
FIG. 2 is a block diagram illustrating a configuration of the brake system according to an exemplary embodiment.

FIG. 2 is a block diagram illustrating a configuration of the brake system according to an exemplary embodiment.

Referring to FIG. 1, the drum brake 10 may include a pair of brake shoes 11*a* and 11*b* which have an arc shape installed to be movable along a surface of a backing plate (not illustrated) coupled to a vehicle body, a drum 12 which has a frictional surface on an inner circumference and rotates jointly with a wheel of a vehicle 1, and an electric actuator 110 which applies force to each of the brake shoes 11*a* and 11*b* in a direction to expand a pair of brake shoes 11*a* and 11*b*.

A frictional member (not illustrated) that applies frictional force to the drum 12 may be attached to a pair of brake shoes 11*a* and 11*b*. The frictional member may decelerate or stop the vehicle 1 through friction with the drum 12.

For example, the frictional member may include a brake lining.

A pair of brake shoes 11*a* and 11*b* may be connected to the electric actuator 110 installed on the backing plate at each of ends facing each other. One side of a pair of brake shoes 11*a* and 11*b* connected to the electric actuator 110 and the other side which is an opposite side may be connected to pins 15*a* and 15*b* of an anchor member 14 fixed to the backing plate. Therefore, the brake shoes 11*a* and 11*b* may not rotate jointly with the drum 12.

A spring 18 may be provided between a pair of brake shoes 11*a* and 11*b*. Further, the brake shoes 11*a* and 11*b* may be fixed to both ends of the spring 18, respectively, and a pair of brake shoes 11*a* and 11*b* may be placed to be close to each other.

The electric actuator 110 may include an electric motor M (or also referred to as a motor), a decelerator, and a pressing mechanism including a ball screw mechanism. When the electric motor M rotates in one direction, an output shaft of the electric motor M rotates and simultaneously, the rotation is reduced by the decelerator. In addition, the rotary motion is converted into a linear motion by the ball screw mechanism, and a pair of brake shoes 11*a* and 11*b* are pressed in a direction to be separated from each other, respectively. As a result, a pair of brake shoes 11*a* and 11*b* to which the frictional member is attached press the drum 12 to generate braking force.

Meanwhile, when the electric motor M rotates in an opposite direction, a pair of brake shoes 11*a* and 11*b* to which the frictional member pressing the drum 12 is attached are separated from the drum 12 to release the braking force.

The drum brake 10 of FIG. 1 described above may be provided on at least one wheel among wheels of the vehicle 1.

Referring to FIG. 2, the brake system 1000 may include the drum brake 10 illustrated in FIG. 1.

Further, the brake system 1000 may include a drive unit 120, a communication unit 130, a current sensor 130, a force sensor 150, and/or a controller 160.

The drive unit 120 may drive the electric actuator 110 of the drum brake 10.

The drive unit 120 may forward rotate or reversely rotate the electric motor M of the electric actuator 110 according to a control signal of the controller 160. For example, the drive unit 120 may include an H-bridge circuit constituted by multiple switching elements to forward rotate and/or reversely power rotate the electric motor M.

The communication unit 130 may communicate with at least one device and/or system including the brake system 1000.

The communication unit 130 may include a communication circuit which may communicate with at least one device of the through a communication network (e.g., a controller vehicle 1 area network (CAN)) for the vehicle 1, and/or a control circuit which controls an operation of the communication circuit.

The current sensor 140 may detect current supplied to the electric motor M of the electric actuator 110.

The force sensor 150 is attached to the drum brake 10, e.g., the anchor member 14 of the drum brake 10 to detect clamping force corresponding to braking torque of the frictional member attached to a pair of brake shoes 11*a* and 11*b* of the drum brake 10 to the drum 12.

The controller 160 may be electrically connected to the drive unit 120, the communication unit 130, the current sensor 140, and/or the force sensor 150, and may control the drive unit 120, the communication unit 130, the current sensor 140, and/or the force sensor 150.

The controller 160 may control an operation of the drum brake 10, more specifically, control the drive unit 120 to drive the electric actuator 110, based on a signal received through the communication unit 130, an output signal of the current sensor 140, and/or an output signal of the force sensor 150.

The controller 160 may receive a signal corresponding to a braking (or also referred to as braking force) generation request and/or a signal corresponding to a braking release request from the vehicle 1 through the communication unit 130. For example, the controller 160 may receive an output signal corresponding to pedal displacement information from a pedal displacement sensor for a brake pedal of the vehicle 1.

The controller 160 may perform braking control for engaging the drum brake 10 or braking release control for engagement release based on the signal received through the communication unit 130.

Upon braking control of the controller 160, braking apply that generates the clamping force required for braking as each of a pair of brake shoes 11*a* and 11*b* is closely attached to the drum 12 through the electric actuator 110 of the drum brake 10 may be performed.

Upon the braking release control of the controller 160, braking release that releases the clamping force generated upon the braking apply described above may be performed as the close attachment of each of a pair of brake shoes 11*a* and 11*b* to the drum 12 is released from the drum 12 through the electric actuator 110 of the drum brake 10.

Upon the braking control of the controller 160, the drive unit 120 rotates the electric motor M in one direction until a current value of the electric motor M of the electric actuator 110 reaches a target current value corresponding to the clamping force required for braking. Meanwhile, when the controller 160 controls the braking release, the drive unit 120 rotates the electric motor M in the opposite direction until the current of the electric motor M reaches a target current value corresponding to the braking release.

For example, when the controller 160 controls the braking, the electric motor M may rotate in a first direction by the drive unit 120. The rotation of the electric motor M in the first direction is decelerated through the decelerator, and the ball screw mechanism is linearly moved by large force, and the drum 12 presses a pair of brake shoes 11*a* and 11*b* to which the frictional member is attached to brake a wheel. When the controller 160 controls the braking release, the drive unit 120 rotates the electric motor M in a second direction which is an opposite direction to the first direction, so a corresponding component of the drum brake 10 may be operated opposite to the braking apply.

The controller 160 may acquire the current of the electric motor M and/or calculate the torque of the electric motor M based on the output signal of the current sensor 140.

The controller 160 may determine and store a position (or also referred to as a first position) of the frictional member attached to a pair of brake shoes 11*a* and 11*b* to the drum 12 at a braking force generation start time based on the current and/or torque of the electric motor M upon the braking control. For example, the controller 160 may identify a position of the frictional member attached to a pair of brake shoes 11*a* and 11*b* to the drum 12 when the current and/or torque of the electric motor M has a predetermined reference value of the current and/or torque of the electric motor M to match the braking force generation start time in response to the braking control. The controller 160 may store the identified position as the position (or also referred to as the first position) of the frictional member attached to a pair of brake shoes 11*a* and 11*b* to the drum 12 at the braking force generation start time.

The controller 160 may acquire the clamping force through the output signal of the force sensor 150.

The controller 160 may determine whether a state of the force sensor 150 is a normal state or a failure state based on the output signal of the force sensor 150.

For example, when the output signal of the force sensor 150 is included in a predetermined normal range, the controller 160 may determine that the force sensor 150 is in the normal state, otherwise, the controller 160 may determine that the force sensor 150 is in the failure state.

The controller 160 may determine a reference position which is the position of the frictional member to the drum 12 at a time when a contact between the frictional member attached to a pair of brake e shoes 11*a* and 11*b* and the drum 12 corresponding to a rotational member is released upon the braking release under different conditions depending on whether the force sensor 150 is in the normal state or the failure state. The detailed description thereof will be described in detail with reference to FIGS. 3 and 4.

Figure 3:
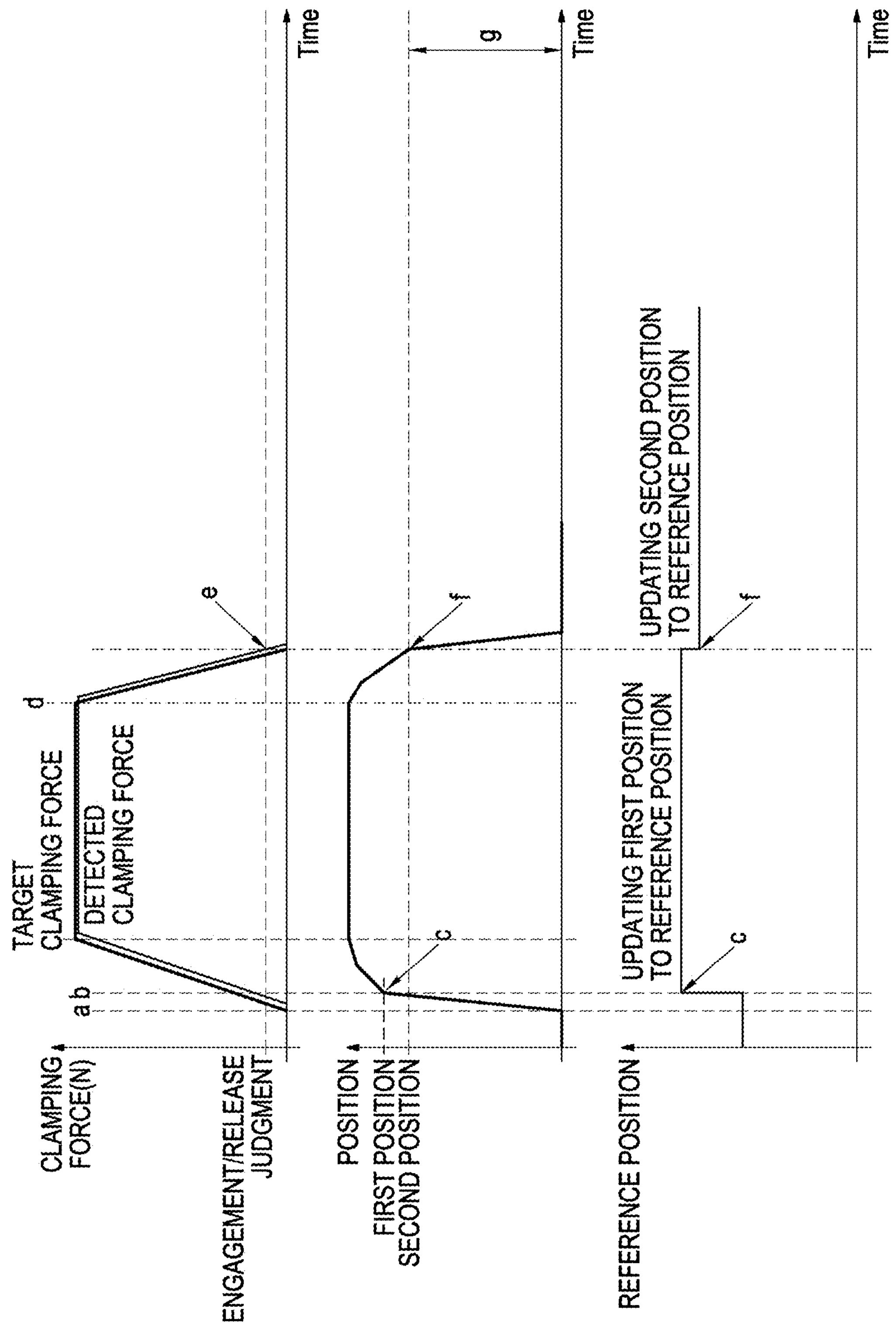
FIG. 3 is a diagram illustrating, as a graph, data acquired upon braking control and braking release control of a controller of the brake system when a force sensor is in a normal state according to an exemplary embodiment.

FIG. 3 is a diagram illustrating, as a graph, data acquired upon braking control and braking release control of a controller 160 of the brake system 1000 when a force sensor is in a normal state according to an exemplary embodiment.

Referring to FIG. 3, the controller 160 may control the electric motor M to rotate in a first direction corresponding to the braking control, and then control the electric motor M to stop to rotate in the first direction of the electric motor M, when receiving a braking force request (a). At this time, the clamping force detected by the force sensor 150 in the normal state rises while following target clamping force, and then clamping force corresponding to a predetermined first value of the target clamping force is maintained.

The controller 160 may determine a first position c of the frictional member to the drum 12 at a braking force generation start time b corresponding to an engagement judgment time and a release judgment time of the braking force, and store the first position c as a reference position, that is, update the existing reference position to the first position, based on the current applied to the electric motor M and/or the torque of the electric motor M while controlling the electric motor M by receiving the braking force request.

Further, the controller 160 may control the electric motor M to rotate in a second direction corresponding to the braking release control, and then release, i.e., terminate the control of the electric motor M, when receiving the braking force release request d. At this time, it can be seen that the clamping force detected by the force sensor 150 in the normal state drops while following target clamping force, and then clamping force corresponding to a predetermined second value of the target clamping force is maintained.

The controller 160 may determine, as an engagement release time e when the contact between the frictional member and the drum 12 is released, a time when the clamping force detected by the force sensor 150 reaches predetermined reference clamping force while controlling the motor M to rotate in the second direction corresponding to the braking release control.

Further, the controller 160 may determine, as a reference position f, a second position of the frictional member to the drum 12 at the engagement release time, and store the second position as the reference position, that is, update the existing reference position to the second position.

The reference position f updated to the second position may be applied as a judgment reference of a contact point of the frictional member and the drum 12 when the force sensor 150 operates normally.

As a result, the controller 160 determines a distance obtained by aggregating the reference position f and a predetermined reference interval g as an interval between the frictional member and the drum 12 to separate the frictional member from the drum 12 by the interval determined from the reference position f.

The predetermined reference interval as a reference interval for preventing drag occurrence may be included in an interval range of 0.3 to 0.8 mm, for example. Further, the predetermined reference interval may also be expressed as a total shoe center clearance (TSCC) between the drum 12 and the frictional member.

Figure 4:
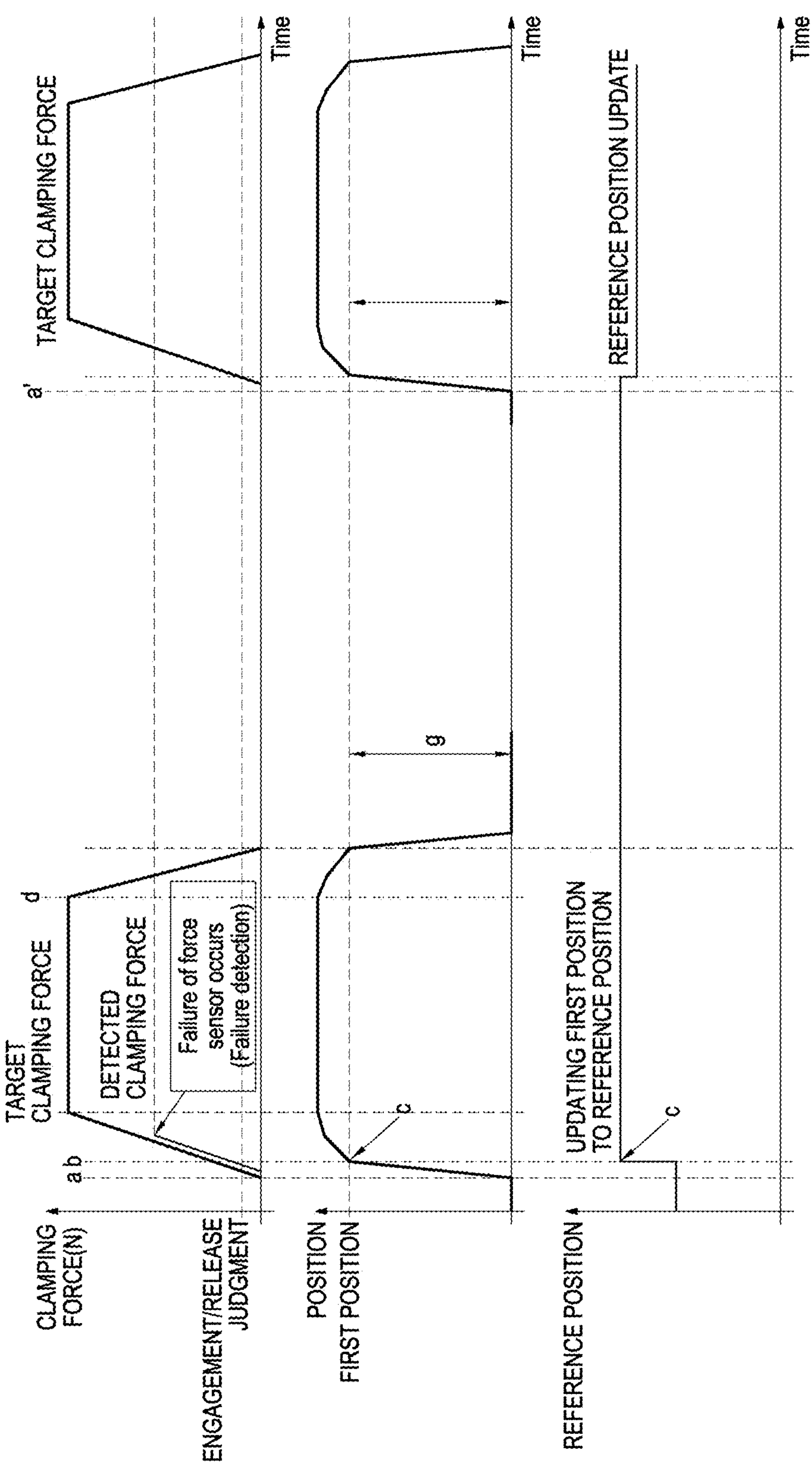
FIG. 4 is a diagram illustrating, as a graph, data acquired upon the braking control and braking release control of the controller of the brake system when the force sensor is in a failure state according to an exemplary embodiment.

FIG. 4 is a diagram illustrating, as a graph, data acquired upon braking control and braking release control of the controller 160 of the brake system 1000 when a force sensor is in a failure state according to an exemplary embodiment.

Referring to FIG. 4, the controller 160 may control the electric motor M to rotate in a first direction corresponding to the braking control, and then control the electric motor M to stop to rotate in the first direction of the electric motor M, when receiving a braking force request a.

The controller 160 may determine a first position c of the frictional member to the drum 12 at a braking force generation start time b corresponding to an engagement judgment time and a release judgment time of the braking force, and store the first position c as a reference position, that is, update the existing reference position to the first position, based on the current applied to the electric motor M and/or the torque of the electric motor M while controlling the electric motor M by receiving the braking force request.

The controller 160 may identify that the clamping force detected based on the output signal of the force sensor 150 does not follow the target clamping force due to the failure of the force sensor 150 while controlling the electric motor M by receiving the braking force request.

The controller 160 may control the electric motor M to rotate in a second direction corresponding to the braking release control, and then release, i.e., terminate the control of the electric motor M, when receiving the braking force release request d.

As in the exemplary embodiment of FIG. 3 described above, due to the failure of the force sensor 150, when the controller 160 determines the reference position by using the output signal of the force sensor 150, an error occurs in the braking control.

As a result, when the force sensor 150 is in the failure state, the controller 160 may maintain the first position c as the reference position without updating the reference position determined as the first position c.

Accordingly, the controller 160 determines a distance obtained by aggregating the reference position c and the predetermined reference interval g as an interval between the frictional member and the drum 12 to separate the frictional member from the drum 12 by the interval determined from the reference position c.

The predetermined reference interval as a reference interval for preventing drag occurrence may be included in an interval range of 0.3 to 0.8 mm, for example. Further, the predetermined reference interval may also be expressed as a total shoe center clearance (TSCC) between the drum 12 and the frictional member.

Thereafter, the controller 160 may repeatedly perform an operation of updating the reference position by determining the first position according to the control of the electric motor M described above when additionally receiving the braking force request a'.

Meanwhile, the controller 160 may include a memory 161 and a processor 163.

The memory 161 may store or memorize a program and data for implementing the operation of controlling the components included in the brake system 1000.

The memory 161 may store a program and/or data for processing each data and/or signal (e.g., the signal received through the communication unit 130, the output signal of the current sensor 140, and/or the output signal of the force sensor 150).

The memory 161 may temporarily memorize each data, and temporarily memorize a processing result of each data of the processor 163.

The memory 161 may include a volatile memory such as a static random access memory (S-RAM), a dynamic random access memory (D-RAM), etc., and a non-volatile memory such as a read only memory (ROM), an erasable programmable read only memory (EPROM), etc.

The processor 163 processes each data to provide a signal for controlling each component (e.g., the drive unit 120 and/or the communication unit 130) of the brake system 1000 to the corresponding component. For example, the processor 163 may include a micro controller (MCU).

Figure 5:
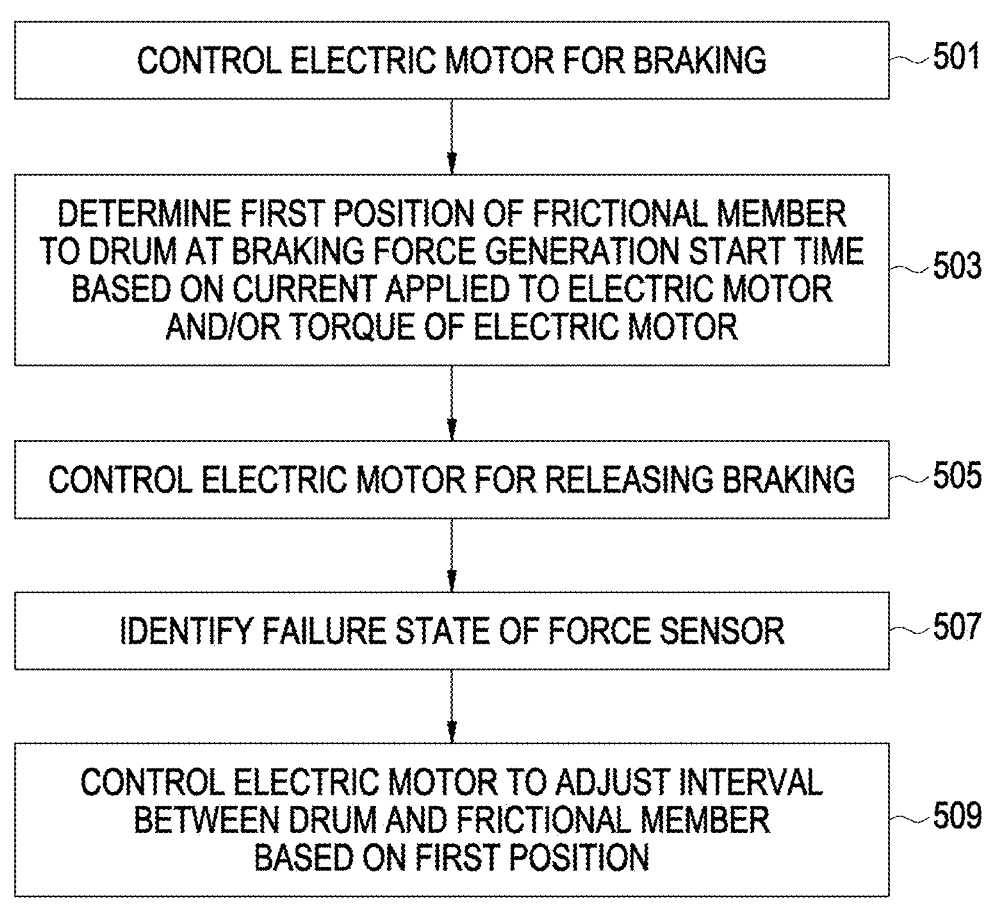
FIG. 5 is a flowchart of an operation of a brake system according to an exemplary embodiment.

FIG. 5 is a flowchart of an operation of a brake system 1000 (and/or the controller 160) according to an exemplary embodiment.

Referring to FIG. 5, the brake system 1000 may control an electric motor M for braking in response to a braking request (501).

The brake system 1000 controls the electric motor M for braking to determine a first position of a frictional member attached to a pair of brake shoes 11*a* and 11*b* to a drum 12 at a braking force generation start time based on current applied to the electric motor M and/or torque of the electric motor M (503).

For example, the brake system 1000 may determine the first position based on a predetermined reference current value and/or a predetermined reference torque value of the electric motor M, and the current applied to the electric motor and/or the torque of the electric motor M by controlling the electric motor M for braking to correspond to the braking force generation start time.

The brake system 1000 may control the electric motor M in order to release the braking according to the operation 501 in response to a braking release request (505).

The brake system 1000 may identify that a force sensor 150 is in a failure state (507).

For example, the brake system 1000 may receive an output signal of the force sensor 150 in response to the control of the electric motor M for braking and/or releasing the braking, and identify that the force sensor 150 is in the failure state based on the output signal of the force sensor 150.

When the force sensor 150 is in the failure state, the brake system 1000 may control the electric motor M so that an interval between a drum 12 and a frictional member attached to a pair of brake shoes 11*a* and 11*b* is adjusted based on the first position determined in the operation 503 (509).

The brake system 1000 may store the first position as a reference position, and control the electric motor M so that the frictional member moves from the drum 12 by an interval obtained by aggregating the reference position and a predetermined reference interval from the reference position.

The predetermined reference interval as a reference interval for preventing drag occurrence may include an interval range of 0.3 to 0.8 mm, for example. Further, the predetermined reference interval may also be expressed as a total shoe center clearance (TSCC) between the drum 12 and the frictional member.

Figure 6:
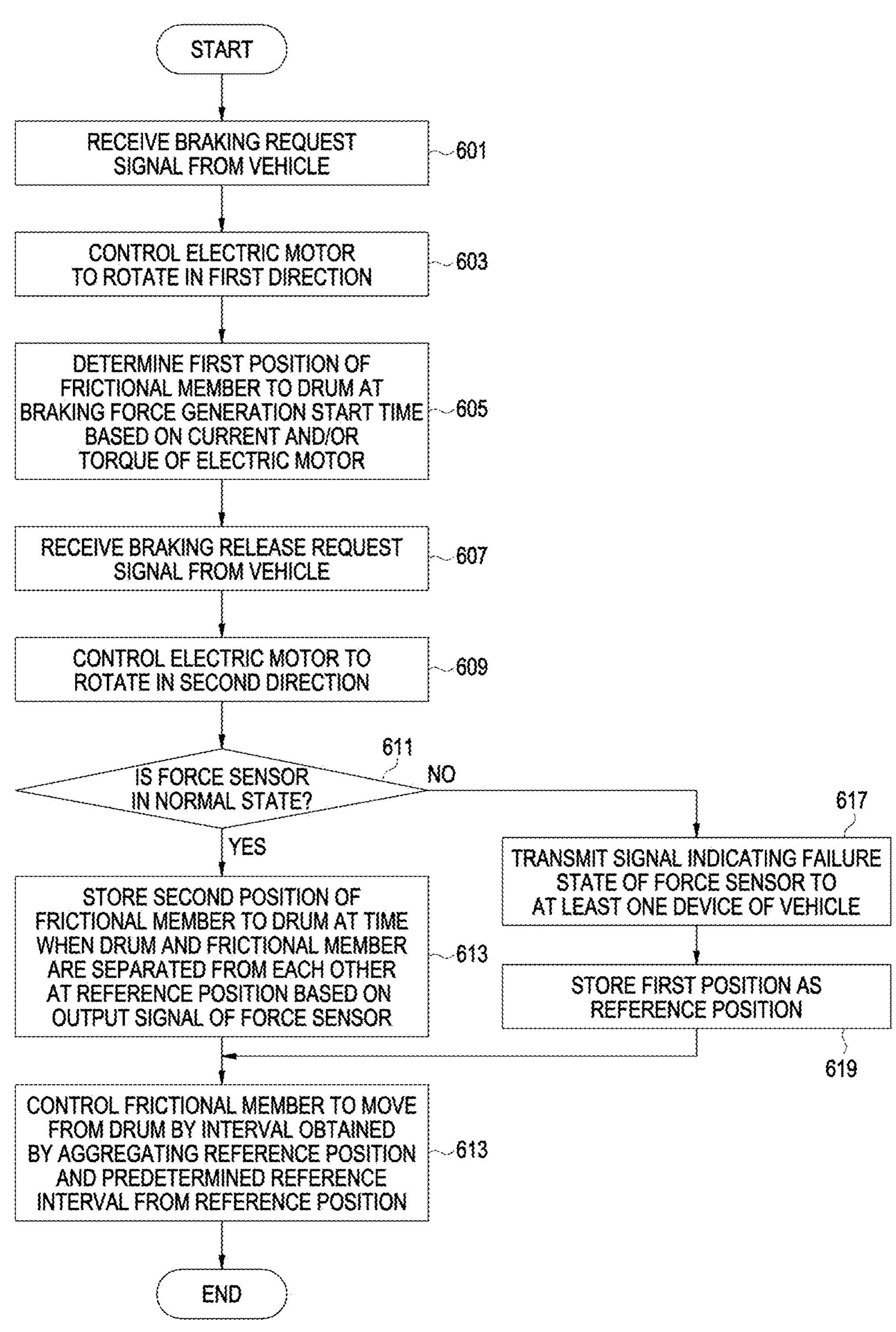
FIG. 6 is a flowchart of an operation of a brake system according to an exemplary embodiment.

FIG. 6 is a flowchart of an operation of the brake system 1000 (and/or the controller 160) according to an exemplary embodiment.

Referring to FIG. 6, the brake system 1000 may receive a braking request signal from a vehicle 1 (601).

For example, the braking request signal may include first displacement information from a brake pedal displacement sensor as a pedal effort is applied to a brake pedal.

When a driver of the vehicle 1 steps on the brake pedal, the brake pedal displacement sensor may output a signal corresponding to the first displacement information of the brake pedal. As a result, the brake system 1000 may receive an output signal corresponding to the first displacement information of the brake pedal from the brake pedal displacement sensor of the vehicle 1 through the communication unit 130.

For example, the braking request signal may include a braking request signal according to an autonomous vehicle hold (AVH) system and/or an autonomous emergency braking (AEB) system of the vehicle 1.

The brake system 1000 may control the electric motor M of the electric actuator 110 to rotate in a first direction corresponding to a braking force generation direction in response to reception of the braking request signal.

The brake system 1000 may determine the first position of the frictional member attached to a pair of brake shoes 11*a* and 11*b* to the drum 12 at the braking force generation start time based on the current and/or torque of the electric motor M.

The brake system 1000 may determine the first position based on the current and/or the torque of the electric motor M, and a reference current value and/or a reference torque value of the electric motor M predetermined to correspond to the braking force generation start time.

For example, the brake system 1000 may identify the first position of the frictional member to the drum 12 at a time when the current and/or the torque of the electric motor M has the predetermined reference current value and/or reference torque value, and store information of the first position.

The brake system 1000 may receive a braking release request signal from the vehicle 1 (607).

For example, the braking release request signal may include second displacement information according to the release of the pedal effort applied to the brake pedal.

When the driver of the vehicle 1 takes off the brake pedal on which the driver steps, the brake pedal displacement sensor may output a signal corresponding to the second displacement information of the brake pedal. As a result, the brake system 1000 may receive an output signal corresponding to the second displacement information of the brake pedal from the brake pedal displacement sensor of the vehicle 1 through the communication unit 130.

For example, the braking release request signal may include a braking release request signal according to the autonomous vehicle hold (AVH) system and/or the autonomous emergency braking (AEB) system of the vehicle 1.

The brake system 1000 may control the electric motor M of the electric actuator 110 to rotate in a second direction corresponding to a braking force release direction in response to reception of the braking release request signal (609).

The brake system 1000 may judge whether a force sensor 150 of a drum brake 10 is in a normal state (611).

The brake system 1000 may judge whether the force sensor 150 is in the normal state or a failure state through monitoring an output signal of the force sensor 150 during rotation control of the electric motor M.

For example, the brake system 1000 may judge that the force sensor 150 is in the failure state when the force sensor 150 outputs an abnormal signal for a predetermined time or more, for example, when the force sensor 150 outputs a signal which deviates from a normal range or outputs a signal which is not changed for a predetermined time or more. Besides, it may be judged whether the force sensor 150 is in the normal state or the failure state by utilizing various conventional failure judgment technologies.

When the force sensor 150 is in the normal state, the brake system 1000 may perform an operation 613, otherwise, in other words, when the force sensor 150 is in the failure state, the brake system 1000 may perform an operation 617 and/or an operation 619.

The brake system 1000 may store, as a reference position, a second position of the frictional member attached to a pair of brake shoes 11*a* and 11*b* to the drum 12 at a time when the drum 12 and the frictional member are separated from each other according to the control of the electric motor M based on the output signal of the force sensor 150 (613).

The brake system 1000 may determine the second position based on the output signal of the force sensor 150, and a reference magnitude of the output signal of the force sensor 150 predetermined to correspond to the time when the drum 12, and the frictional member attached to a pair of brake shoes 11*a* and 11*b* are separated from each other.

For example, the brake system 1000 may identify the second position of the frictional member to the drum 12 at a time when the output signal of the force sensor 150 has the predetermined reference magnitude of the output signal of the force sensor 150, and store information of the second position.

The brake system 1000 may control the electric motor M to move the frictional member attached to a pair of brake shoes 11*a* and 11*b* from the drum 12 by an interval obtained by aggregating the reference position and a predetermined reference interval from the reference position (615).

The predetermined reference interval as a reference interval for preventing drag occurrence may include an interval range of 0.3 to 0.8 mm, for example. Further, the predetermined reference interval may also be expressed as a total shoe center clearance (TSCC) between the drum 12 and the frictional member.

The brake system 1000 may estimate a movement distance of the frictional member attached to a pair of brake shoes 11*a* and 11*b* based on a rotational speed of the electric motor M, and control the electric motor M to move the frictional member attached to a pair of brake shoes 11*a* and 11*b* from the drum 12 by the interval obtained by aggregating the reference position and the predetermined reference interval from the reference position, based on the estimated movement distance.

For example, the brake system 1000 may estimate the rotational speed of the electric motor M based on voltage and current of the electric motor M.

Further, for example, the brake system 1000 estimates the interval between the frictional member and the drum 12 based on the estimated movement distance of the frictional member to terminate the corresponding control by identifying that the frictional member moves from the drum 12 by the interval obtained by aggregating the reference position and the predetermined reference interval from the reference position.

The brake system 1000 may transmit a signal indicating the failure of the force sensor 150 to at least one device (e.g., the controller) of the vehicle 1 through the communication unit 130 (617).

As a result, at least one device of the vehicle 1 receives the signal indicating the failure of the force sensor 150 to output related information through an output unit (e.g., a display, a cluster, and/or a microphone) of the vehicle 1 visually and/or through a voice.

The brake system 1000 may store, as the reference position, the first position determined in the operation 605 in response to the operation 611 or the operation 617 described above (619).

The brake system 1000 may perform the operation 615 described above in response to the operation 619.

The brake system 1000 and the control method thereof according to the exemplary embodiments described above may secure the braking stability of the brake system 1000 even when the force sensor 150 is in the failure state.

For example, the brake system 1000 and the control method thereof may provide a technology that may generate the braking force even when the force sensor 150 is in the failure state.

Further, the brake system 1000 and the control method thereof may provide a technology that may prevent the drag phenomenon even when the force sensor 150 is in the failure state.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A brake system comprising:

a drum;

a brake shoe including a frictional member applying frictional force to the drum;

a motor configured to move the brake shoe;

a force sensor configured to detect clamping force of the frictional member to the drum; and a controller electrically connected to the motor and the force sensor, wherein the controller is configured to determine a first position of the frictional member to the drum at a braking force generation start time based on current applied to the motor or torque of the motor upon controlling the motor for braking, and control the motor so that an interval between the drum and the frictional member is adjusted based on the first position when the force sensor is in a failure state upon controlling the motor for releasing the braking, wherein the controller is configured to control the motor so that the interval between the drum and the frictional member is further increased by an interval obtained by aggregating the first position and a predetermined reference interval from the first position, when the force sensor is in the failure state upon controlling the motor for releasing the braking.

2. The brake system according to claim 1, wherein the controller is configured to, when the force sensor is in a normal state upon controlling the motor for releasing the braking, identify a time when the drum and the frictional member are separated from each other based on an output signal of the force sensor, and control the motor to adjust the interval between the drum and the frictional member based on a second position of the frictional member to the drum at the identified time.

3. The brake system according to claim 2, wherein the controller is configured to control the motor so that the interval between the drum and the frictional member is further increased by an interval obtained by aggregating the second position and a predetermined reference interval from the second position, when the force sensor is in the normal state upon controlling the motor for releasing the braking.

4. The brake system according to claim 2, wherein the controller is configured to determine the second position based on a reference magnitude of the output signal of the force sensor, which is predetermined to correspond to the time when the drum and the frictional member are separated from each other.

5. The brake system according to claim 2, wherein the controller is configured to determine a state of the force sensor as the failure state or the normal state based on the output signal of the force sensor.

6. The brake system according to claim 5, wherein the controller is configured to determine the state of the force sensor as the failure state or the normal state in response to the control of the motor for releasing the braking.

7. The brake system according to claim 1, wherein the controller is configured to determine the first position further based on a reference current value or a reference torque value of the motor, which is predetermined to correspond to the braking force generation start time.

8. The brake system according to claim 1, further comprising:

a communication unit configured to communicate with at least one device of a vehicle, wherein the controller is configured to control the motor to achieve the braking or release the braking based on a braking request signal or a braking release request signal received through the communication unit.

9. The brake system according to claim 1, further comprising:

a communication unit configured to communicate with at least one device of a vehicle, wherein the controller is configured to transmit information indicating that the force sensor is in the failure state to the at least one device of the vehicle through the communication unit.

10. A control method of a brake system including a drum, a brake shoe including a frictional member applying frictional force to the drum, a motor configured to move the brake shoe, and a force sensor configured to detect clamping force of the frictional member to the drum, comprising:

determining a first position of the frictional member to the drum at a braking force generation start time based on current applied to the motor or torque of the motor upon controlling the motor for braking; and controlling the motor so that an interval between the drum and the frictional member is adjusted based on the first position when the force sensor is in a failure state upon controlling the motor for releasing the braking, wherein the controlling of the motor so that the interval between the drum and the frictional member is adjusted based on the first position includes controlling the interval between the drum and the frictional member to be further increased by an interval obtained by aggregating the first position and a predetermined reference interval from the first position.

11. The control method of a brake system according to claim 10, comprising:

when the force sensor is in a normal state upon controlling the motor for releasing the braking identifying a time when the drum and the frictional member are separated from each other based on an output signal of the force sensor, and controlling the motor to adjust the interval between the drum and the frictional member based on a second position of the frictional member to the drum at the identified time.

12. The control method of a brake system according to claim 11, wherein the controlling of the motor so that the interval between the drum and the frictional member is adjusted based on the second position includes controlling the motor so that the interval between the drum and the frictional member is further increased by an interval obtained by aggregating the second position and a predetermined reference interval from the second position.

13. The control method of a brake system according to claim 11, wherein the second position is determined based on a reference magnitude of the output signal of the force sensor, which is predetermined to correspond to the time when the drum and the frictional member are separated from each other.

14. The control method of a brake system according to claim 11, further comprising:

determining a state of the force sensor as the failure state or the normal state based on the output signal of the force sensor.

15. The control method of a brake system according to claim 14, wherein the determining of the state of the force sensor as the failure state or the normal state is performed in response to the control of the motor for releasing the braking.

16. The control method of a brake system according to claim 10, wherein the determining of the first position is performed further based on a reference current value or a reference torque value of the motor, which is predetermined to correspond to the braking force generation start time.

17. The control method of a brake system according to claim 10, wherein the controlling of the motor for the braking and the controlling of the motor for releasing the braking are performed based on reception of a braking request signal or a braking release request signal of the vehicle.

18. The control method of a brake system according to claim 10, further comprising:

transmitting information indicating that the force sensor is in the failure state to at least one device of the vehicle.

* * * * *